(12) United States Patent
Nakagawa et al.

(10) Patent No.: US 7,682,551 B2
(45) Date of Patent: Mar. 23, 2010

(54) METHOD FOR MANUFACTURING THREE-DIMENSIONAL PHOTONIC STRUCTURE

(75) Inventors: Takuji Nakagawa, Muko (JP); Kikuo Wakino, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1102 days.

(21) Appl. No.: 10/525,379

(22) PCT Filed: Jun. 4, 2004

(86) PCT No.: PCT/JP2004/008875

§ 371 (c)(1),
(2), (4) Date: Feb. 23, 2005

(87) PCT Pub. No.: WO2005/002833

PCT Pub. Date: Jan. 13, 2005

(65) Prior Publication Data

US 2005/0285115 A1 Dec. 29, 2005

(30) Foreign Application Priority Data

Jul. 1, 2003 (JP) .............................. 2003-189374

(51) Int. Cl.
*B29C 35/08* (2006.01)
*B29C 41/02* (2006.01)
*B29C 41/20* (2006.01)
(52) U.S. Cl. ..................................... 264/401; 264/279
(58) Field of Classification Search ................. 264/279, 264/401
See application file for complete search history.

(56) References Cited

U.S. PATENT DOCUMENTS

| 5,173,220 A | * | 12/1992 | Reiff et al. .................. 264/401 |
| 5,705,117 A | * | 1/1998 | O'Connor et al. ........... 264/401 |
| 6,547,982 B1 | | 4/2003 | Shepherd et al. |

FOREIGN PATENT DOCUMENTS

| CN | 1240030 A | 12/1999 |
| JP | 2000-341031 | 12/2000 |
| JP | 2001-502256 | 2/2001 |
| JP | 2001-237616 | 8/2001 |
| JP | 2004-42546 | 2/2004 |

OTHER PUBLICATIONS

Official Communication cited in corresponding Chinese Patent Application No. 200480000857.8, issued Jun. 2, 2006.
Official communication issued in the counterpart Chinese Application No. 200480000857.8, mailed on Sep. 7, 2007.

* cited by examiner

*Primary Examiner*—Leo B Tentoni
(74) *Attorney, Agent, or Firm*—Keating & Bennett, LLP (57) ABSTRACT

A three-dimensional component having cavities containing a photocurable resin material and having a structure in which a plurality of cured resin layers composed of the photo-cured resin material are stacked, is manufactured by stereolithography. Inorganic members are inserted into concave portions when the concave portions are formed before covering the cavities, each of the concave portions being at least a portion of the corresponding cavity, and the photocurable resin material remaining. When the three-dimensional component is completed, the photocurable resin material remaining in the cavity is thermally cured, thus being brought into contact with the inorganic members. In this manner, a three-dimensional photonic structure having the plurality of inorganic members precisely disposed at desired periodic positions within the resin matrix is efficiently manufactured.

10 Claims, 6 Drawing Sheets

METHOD FOR MANUFACTURING THREE-DIMENSIONAL PHOTONIC STRUCTURE

BACKGROUND OF THE INVENTION

1. Field of the Invention

The present invention relates to a three-dimensional photonic structure and a method for manufacturing the three-dimensional photonic structure. In particular, the present invention relates to a method for manufacturing a three-dimensional photonic structure having a plurality of inorganic members disposed at specific locations in a resin and to a three-dimensional photonic structure produced by the method.

2. Description of the Related Art

Photonic crystals include material bodies periodically disposed in a specific substance, each of the material bodies having a dielectric constant that is different from the dielectric constant of the specific substance, and the photonic crystals completely reflect electromagnetic waves having specific wavelengths due to the mutual interference of electromagnetic waves. The frequencies of such electromagnetic waves that are completely reflected are in a specific range, which is called a "photonic band gap".

When an electromagnetic wave enters a periodic dielectric structure, two kinds of standing waves are produced by Bragg diffraction. One standing wave oscillates in a region having a low dielectric constant, and another standing wave oscillates in a region having a high dielectric constant. The former has an energy level that is greater than that of the latter. That is, waves having energy levels between energy levels of the two standing waves, which have different modes from each other, cannot enter the crystal, and therefore, a photonic band gap is produced.

Since photonic band gaps, as described above, are produced by Bragg diffraction, it is necessary that lattice constants, which are repetition periods in periodic structures, correspond to wavelengths. An increase in the difference between dielectric constants increases the difference between vibrational energy levels in dielectric phases, thus increasing the photonic band gap. A higher dielectric constant reduces vibrational energy. As a result, the photonic band gap shifts to lower frequencies.

Various photonic crystals have been developed. To completely reflect a three-dimensional electromagnetic wave, it is necessary to produce a photonic band gap in all directions. A photonic crystal that meets such a demand includes, for example, a diamond structure. However, since diamond structures are complicated, it is difficult to manufacture such a diamond structure. A process for manufacturing a photonic crystal by stereolithography is presently being examined.

Examples of processes for manufacturing photonic crystals by stereolithography include the following approaches.

First, for example, Japanese Unexamined Patent Application Publication No. 2000-341031 discloses a process for manufacturing a photonic crystal as follows: two-dimensional basic structures each having a plurality of rods are formed and successively stacked to produce a photonic crystal by stereolithography with a composite material composed of a photocurable resin containing a powdered dielectric ceramic.

Second, for example, Japanese Translation Patent Publication No. 2001-502256 discloses a process in which a three-dimensional component, which is composed of a photocurable resin, having voids formed at predetermined locations is manufactured and then a composite material composed of a resin into which dielectric ceramic powders are dispersed is charged into the voids.

For example, Japanese Unexamined Patent Application Publication No. 2001-237616 discloses a process, where stereolithography is not applied, in which a coating containing a powdered low-dielectric ceramic is printed in a dot pattern on a green sheet containing a powdered high-dielectric ceramic and then the resulting green sheets are stacked and sintered.

However, the above-described processes have problems.

It is difficult to manufacture a photonic crystal that contains a low-loss dielectric having high-dielectric constant by these processes disclosed in Japanese Unexamined Patent Application Publication No. 2000-341031 and Japanese Translation Patent Publication No. 2001-502256 because, in the processes disclosed in these Patent Publications, a composite material composed of a resin into which a powdered dielectric ceramic is dispersed is used as a dielectric.

A process disclosed in Japanese Unexamined Patent Application Publication No. 2000-341031 applies the difference between the dielectric constant of a composite material composed of a resin mixed with a powdered dielectric ceramic and the dielectric constant of air that is present between rods composed of the composite material. In this case, since the dielectric constant of the composite material is determined by the mixing ratio of the resin and the powdered dielectric ceramic, the above-described difference between these dielectric constants is only determined by the dielectric constant of the composite material. As a result, the range of the resulting photonic band gap is limited.

In each process disclosed in Japanese Unexamined Patent Application Publication No. 2000-341031 and Japanese Translation Patent Publication No. 2001-502256, it is necessary to supply a liquid photocurable resin so as to form a layer having a predetermined thickness on a platform by gradually lowering the platform. Accordingly, the use of a liquid photocurable resin having a high viscosity barely forms any shape. Hence, in a process, particularly disclosed in Japanese Translation Patent Publication No. 2001-502256, when a powdered dielectric ceramic is mixed with a liquid photocurable resin, the content of the powdered dielectric ceramic is limited, i.e., to about 60% at an upper limit. Even when the content of the powdered dielectric ceramic is about 60%, the dielectric constant of the composite material is about ¼ or less of that of the dielectric ceramic used. Therefore, high contrast photonic crystals cannot be satisfactorily produced.

On the other hand, in a process disclosed in Japanese Unexamined Patent Application Publication No. 2001-237616, since dots composed of a powdered low-dielectric ceramic are merely printed, these dots cannot be formed in substantially three-dimensional shapes. Furthermore, these dots cannot be disposed at desired locations along the stacking direction because of the limitation caused by the thickness of the green sheet. In addition, since the green sheets and the dots shrink when sintering, it is difficult dispose the dots at a desired period in the sintered body and so as to form a desired photonic band gap.

SUMMARY OF THE INVENTION

To overcome the problems described above, preferred embodiments of the present invention provide a method for manufacturing a three-dimensional photonic structure and a three-dimensional photonic structure manufactured by the method.

A preferred embodiment of the present invention provides a method for manufacturing a three-dimensional photonic structure having a plurality of inorganic members composed of an inorganic material and a resin matrix, within which the plurality of inorganic members are disposed, composed of a photocurable resin material. To overcome the above-described problems, the method includes the following steps.

The plurality of inorganic members and a photocurable resin material are prepared. A stereolithographic step of successively and repeatedly curing stacked layers composed of the photocurable resin material along the stacking direction to form a three-dimensional component such that cavities filled with the photocurable resin material are formed at locations to be occupied by the inorganic members in the three-dimensional component having a structure in which the plurality of cured resin layers composed of the photo-cured resin material are stacked, is performed. An inserting substep of inserting the inorganic members into concave portions when the concave portions are formed before closing the cavities during the stereolithographic step is performed, each of the concave portions being at least a portion of the corresponding cavity and having an opening through which each of the inorganic members can pass, each gap between the surface of each of the concave portions and the corresponding inorganic member being filled with the photocurable resin material. The photocurable resin material in each of the gaps is thermally cured.

The method for manufacturing a three-dimensional photonic structure according to a preferred embodiment of the present invention further includes the steps of generating the three-dimensional data of the shape of the three-dimensional component in advance, generating slice data from the three-dimensional data, the slice data being generated by slicing the three-dimensional component in a direction that is substantially perpendicular to the stacking direction of the three-dimensional component, and generating raster data for scanning laser light from the slice data, wherein, in the stereolithographic step, the photocurable resin material is preferably cured repeatedly in the form of layers by scanning the laser light according to the raster data.

Inorganic members having a dielectric constant greater than that of the photo-cured resin material are preferably used. In this case, the inorganic members are preferably a ceramic sinter.

The photocurable resin material used is preferably capable of forming a plurality of pores within the photocurable resin.

The present invention also relates to a three-dimensional photonic structure manufactured by the method described above.

As described above, according to a preferred embodiment of the present invention, a three-dimensional component having a structure in which a plurality of cured resin layers composed of the photo-cured resin material are stacked, and having cavities containing the photocurable resin material is produced by a stereolithographic step. In addition, the inorganic members are inserted into concave portions when the concave portions are formed before closing the cavities during the stereolithographic step, each of the concave portions being at least a portion of the corresponding cavity. The photocurable resin material remains in the concave portions. Then, the photocurable resin material in the cavities is thermally cured. Consequently, the plurality of inorganic members is disposed at desired periodic locations with precision.

Furthermore, the inorganic members are prepared independently. Thus, the dielectric constants, sizes, shapes, and other aspects of the inorganic members may be adjusted as desired before being inserted into the concave portions. These dielectric constants, sizes, shapes, and other aspects are maintained in the resulting three-dimensional photonic structure.

In addition, the spaces between the plurality of inorganic members may be set as desired.

Consequently, with the three-dimensional photonic structure according to preferred embodiments of the present invention, the effect of a photonic band gap corresponding to desired wavelengths is obtained. A satisfactorily wide photonic band gap is also obtained. As a result, electromagnetic waves having specific wavelengths can be shielded with high contrast. For example, highly efficient electromagnetic-wave filters and electromagnetic barriers can be manufactured.

Preferred embodiments of the present invention include the steps of generating the three-dimensional data of the shape of the three-dimensional component in advance, generating slice data from the three-dimensional data, the slice data being generated by slicing the three-dimensional component in a direction that is substantially perpendicular to the stacking direction of the three-dimensional component, and generating raster data for scanning laser light from the slice data, wherein, in the stereolithographic step, the photocurable resin material is repeatedly cured in the form of layers by scanning the laser light according to the raster data. Therefore, the preparing step before the stereolithographic step and the stereolithographic step are efficiently performed.

As described above, according to preferred embodiments of the present invention, since dielectric constants of the inorganic members can be adjusted as desired, inorganic members having a dielectric constant greater than that of the photo-cured resin material can be easily provided and used. As a result, a photonic crystal having a greater difference between dielectric constants can be manufactured. Therefore, the photonic band gap is easily increased.

The use of ceramic sintered bodies as the inorganic members described above does not produce a nonuniform distribution of the dielectric constant within the inorganic members. Therefore, a three-dimensional photonic structure having a desired photonic band gap is easily manufacturing. In addition, such inorganic members are stable with respect to temperature and humidity.

In preferred embodiments of the present invention, the use of a photocurable resin material capable of forming a plurality of pores within the photocurable resin material reduces the dielectric constant of the resin matrix in the three-dimensional photonic structure as compared to that of a photocurable resin material having no pores. Therefore, a greater difference of the dielectric constants between the resin matrix and the inorganic members is achieved.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
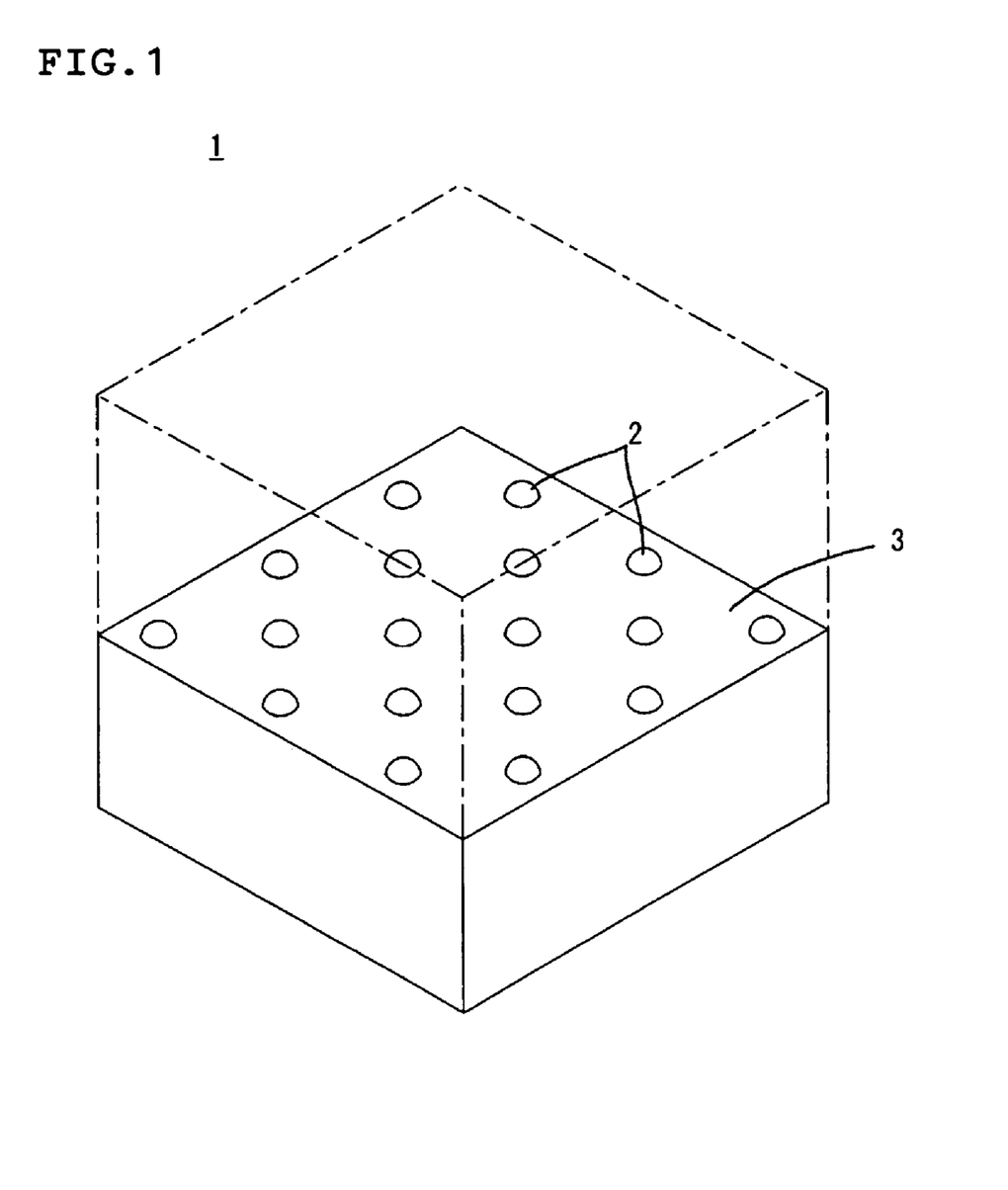
FIG. 1 is a perspective view showing a three-dimensional photonic structure, in which the upper portion of the three-dimensional photonic structure is cut away, according to a preferred embodiment of the present invention.

A three-dimensional photonic structure 1 according to a preferred embodiment of the present invention will now be described with reference to FIG. 1. In FIG. 1, in order to show a portion of the inner structure of the three-dimensional photonic structure 1, the three-dimensional photonic structure 1 in which the upper portion of the three-dimensional photonic structure 1 is cut away is illustrated.

The three-dimensional photonic structure 1 is provided with a plurality of inorganic members 2 composed of an inorganic material and a resin matrix 3 within which the plurality of inorganic members 2 are disposed, the resin matrix 3 being composed of a photocurable resin material.

Each of the inorganic members 2 preferably has a dielectric constant that is greater than that of the resin matrix 3 and, for example, is a ceramic sinter. Examples of the high-dielectric ceramics defining the inorganic members 2 include $BaTiO_3$, $PbTiO_3$, $NaVO_3$, $(Ba, Sr)TiO_3$, $KNbO_3$, $LiTaO_3$, $(Ba, Pb)ZrO_3$, $Pb(Mg, W)ZrO_3$, $Pb(Mg, Nb)ZrO_3$, $Pb(Zr, Ti)O_3$, $CaTiO_3$, and $TiO_2$. Furthermore, the materials defining the inorganic members 2 are not limited to the above-described high-dielectric ceramics, but also include, for example, crystals of high-dielectric materials (single crystals may be used) and composites composed of high-dielectric materials.

As described above, the inorganic members 2 composed of high-dielectric material easily has a dielectric constant that is greater than that of a composite material composed of a resin containing a powdered dielectric ceramic and achieves a uniform dielectric constant within the inorganic members. Alternatively, the inorganic members 2 composed of ceramic sintered bodies are stable with respect to, for example, temperature and humidity.

In this preferred embodiment, the inorganic members 2 have spherical shapes. However, the shapes of the inorganic members 2 are not limited to spherical shapes, and may include, for example, prisms, polyhedrons, rhombohedrons, cones, and cylinders.

Examples of photocurable resin materials defining the resin matrix 3 include epoxy photocurable resins and acrylate photocurable resins. To adjust the dielectric constants of these photo-cured resins, for example, dielectric ceramic particles may be mixed and dispersed into such resin materials.

In the three-dimensional photonic structure 1 shown in FIG. 1, only the inorganic members 2 are partially illustrated. In fact, a plurality of inorganic members 2 are disposed so as to form, for example, a diamond structure.

To manufacture the three-dimensional photonic structure 1 shown in FIG. 1, the following steps are performed.

A three-dimensional component corresponding to the resin matrix 3 of the three-dimensional photonic structure 1 to be manufactured is designed with a computer-aided design (CAD) program and then converted into stereolithographic (STL) data, which is three-dimensional data approximated with a triangular mesh.

Figure 2:
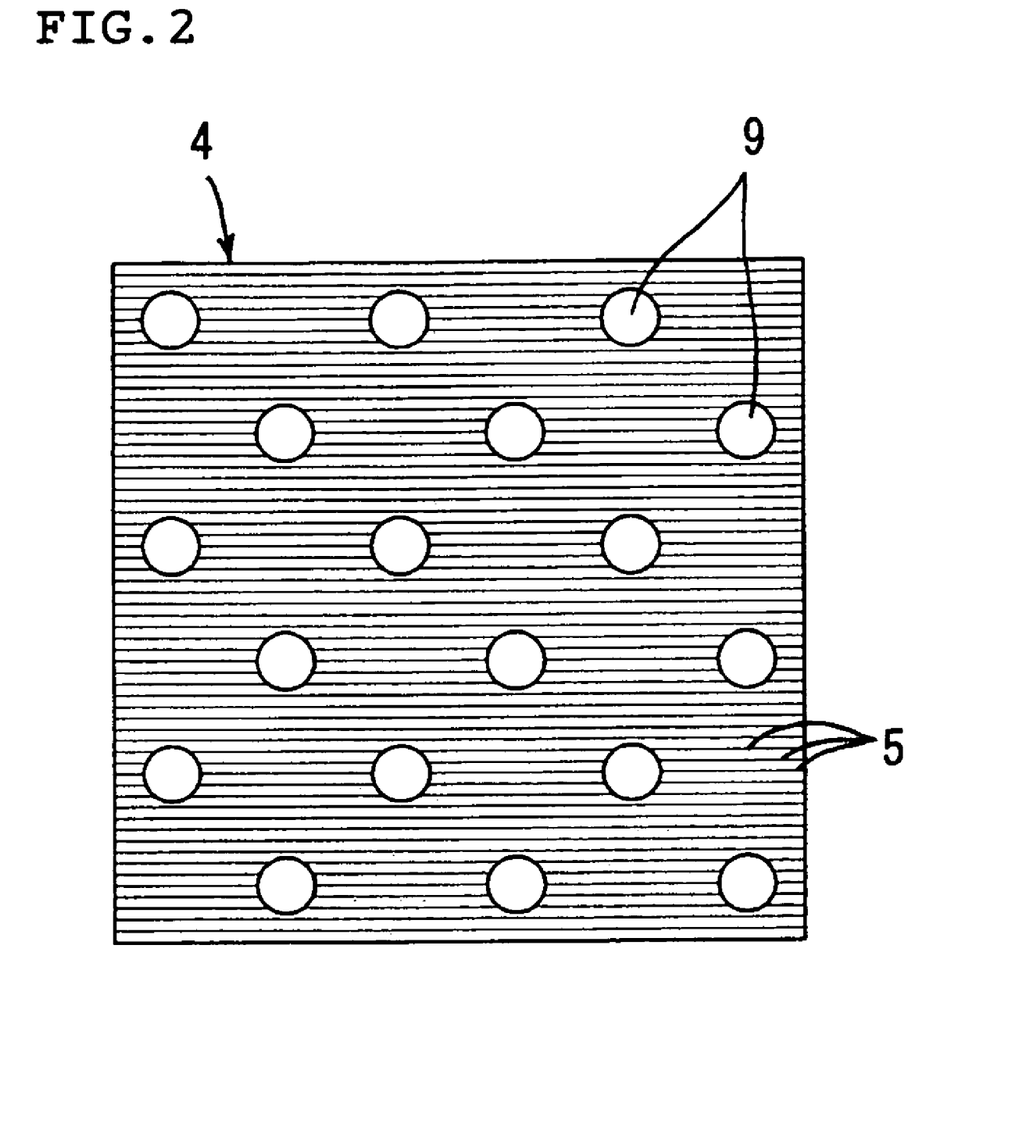
FIG. 2 illustrates a step of generating slice data of a three-dimensional component in order to manufacture the three-dimensional photonic structure shown in FIG. 1.

The STL data is loaded into a computer. As shown in FIG. 2, slice data is generated from this STL data. The slice data is generated by slicing the three-dimensional component 4 along a plane 5 perpendicular to the stacking direction of the three-dimensional component 4.

Next, raster data is generated from the slice data. The raster data functions as scanning data for controlling the scan mode of laser light 8, such as ultraviolet laser light, emitted from a laser light source 7 equipped with the stereolithograph 6 shown in FIG. 3.

Consequently, as shown in FIG. 2, locations 9 to be three-dimensionally occupied by the inorganic members 2 in the three-dimensional component 4 are determined.

Figure 3:
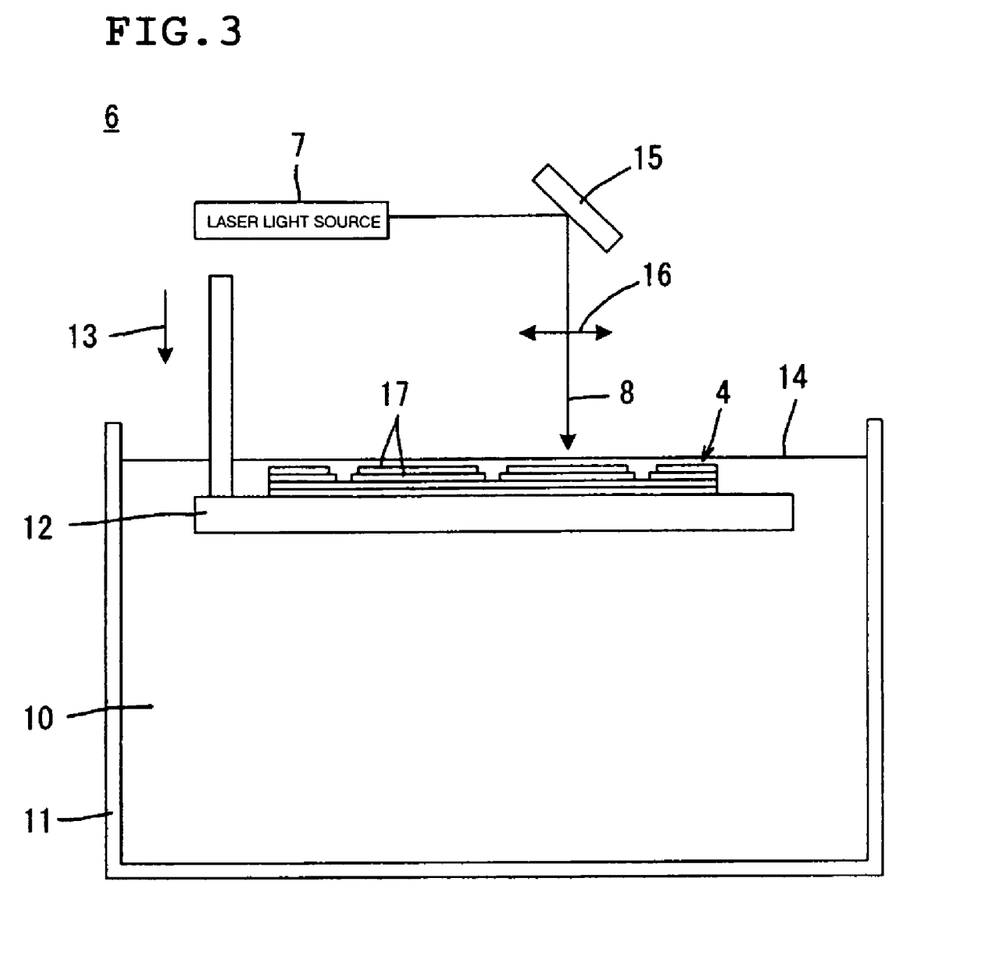
FIG. 3 is a schematic front view of a stereolithograph used in a stereolithographic step of manufacturing the three-dimensional photonic structure.

The plurality of inorganic members 2 and the photocurable resin material, both of which define the three-dimensional photonic structure 1, are prepared and then a stereolithographic step is performed with the stereolithograph 6 shown in FIG. 3.

FIG. 3 is a schematic front view of the stereolithograph 6.

The stereolithograph 6 is provided with a bath 11 containing a photocurable resin material 10. A platform 12 for manufacturing the three-dimensional component 4 (see FIG. 4) on the platform 12 is disposed in the bath 11. As indicated by an arrow 13, the platform 12 is driven so as to be gradually lowered to predetermined heights.

A scanning mirror 15, which reflects the laser light 8 emitted from the laser light source 7 toward a liquid level 14 of the photocurable resin material 10, is disposed above the platform 12. The scanning mirror 15 is disposed such that an angle of reflection can be changed according to the raster data. The laser light 8 scans along the liquid level 14 with the mirror in directions indicated by a double headed arrow 16. The portion of the photocurable resin material 10 scanned by the laser light 8 is cured.

As shown in FIG. 3, the platform 12 is disposed so as to supply the liquid photocurable resin material 10 between the platform 12 and the liquid level 14 to form a layer having a predetermined thickness, for example, about 100 μm. The liquid level 14 is adjusted by a squeegee and then the excess of the photocurable resin material 10 is returned to the bath 11. In this state, the laser light 8 scans across the photocurable resin material 10 according to the above-described raster data, such that the photocurable resin material 10 is cured into a cured resin layer 17 at the portion irradiated with the laser light 8.

Next, the platform 12 is moved in the direction indicated by the arrow 13 so as to resupply the photocurable resin material 10 between the resulting cured resin layer 17 and the liquid level 14 to form a layer having a predetermined thickness. Then, the laser light 8 is rescaned according to the raster data. In this manner, another cured resin layer 17 composed of the photo-cured resin material 10 is formed.

As described above, the formation of the cured resin layer 17 irradiated with the laser light 8 and the downward transfer of the platform 12 are repeated. In this manner, the three-dimensional component 4 including a plurality of cured resin layers 17 composed of the photo-cured resin material 10 that are stacked is produced by successively curing stacked layers composed of the photocurable resin material 10 from one end along the stacking direction.

Figure 4A:
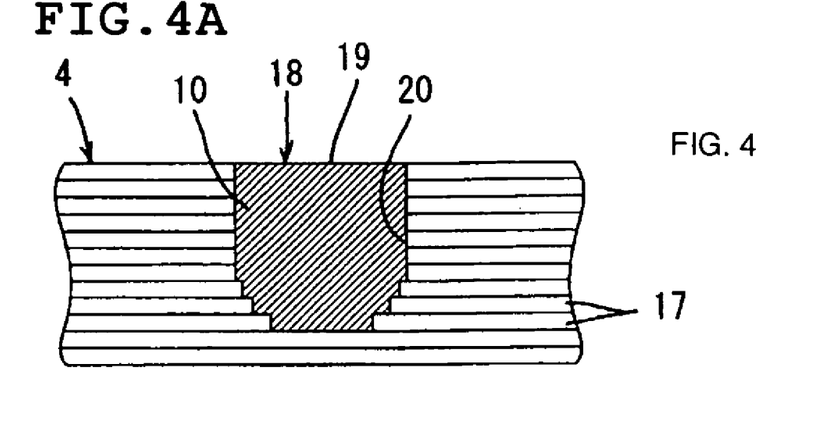
FIGS. 4A-4C are fragmentary cross-sectional views of the three-dimensional component and illustrates states at some points in the stereolithographic step performed with the stereolithograph shown in FIG. 3 in time sequence.
Figure 4B:
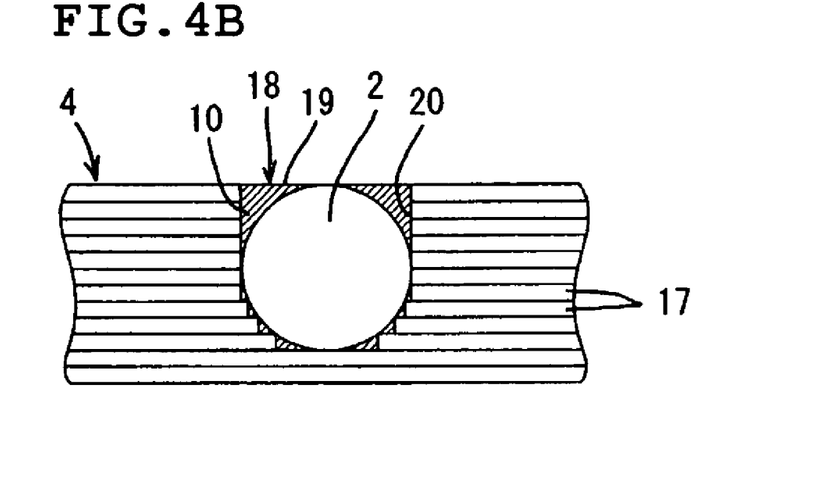
Figure 4C:
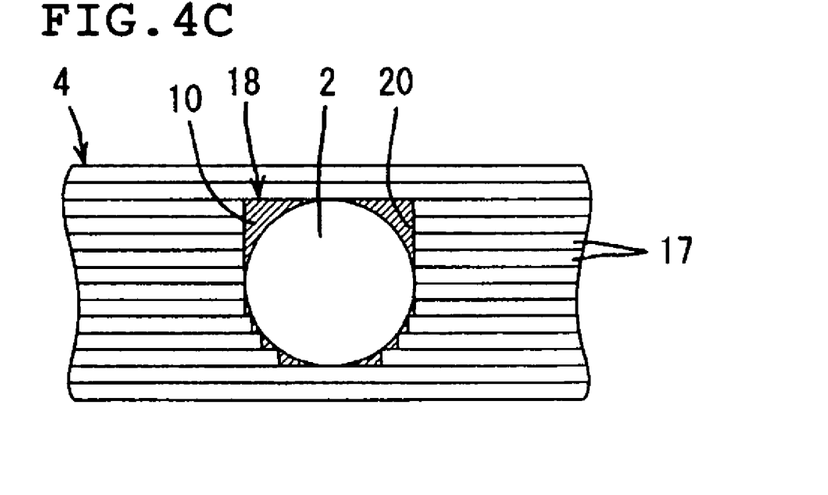

When the three-dimensional component 4 is manufactured by the above-described stereolithographic step, as shown in FIGS. 4A-4C, cavities 18 are formed at locations to be occupied by the inorganic members 2. The cavity 18 is filled with the photocurable resin material 10. FIGS. 4A-4C illustrate states that occur during the stereolithographic step; in particular, FIG. 4 (A) illustrates a state before covering the cavity 18.

As shown in FIG. 4 (A), when concave portions 20, each of which is to be included in at least a portion of the corresponding cavity 18 and includes an opening 19 through which each of the inorganic members 2 can pass, are completed before covering the cavities 18, as shown in FIG. 4 (B), the inorganic members 2 are inserted into the respective concave portions 20. At this time, the photocurable resin material 10 remains between the surface of each of the concave portions 20 and the corresponding inorganic material member 2.

In the step of inserting the inorganic members 2 into the concave portions 20 described above, the photocurable resin material 10 in each concave portion 20 can overflow from the opening 19. When such an overflow of the photocurable resin material 10 is undesired, the overflowed photocurable resin material 10 may be removed with, for example, a squeegee.

After inserting the inorganic members 2 as described above, the stereolithographic step is subsequently performed. As shown in FIG. 4 (C), the concave portions 20 are covered with the respective cured resin layers 17 to form cavities 18.

In this preferred embodiment with reference to FIGS. 4A-4C, each of the inorganic members 2 is inserted when each of the concave portions 20 having a size capable of accommodating the entire inorganic member 2 is formed. Alternatively, each of the inorganic members 2 may be inserted into the corresponding concave portion 20 when each of the concave portions 20 having a size capable of accommodating, for example, only the lower half of the inorganic member 2 is formed.

Alternatively, when the photocurable resin material 10 has a low viscosity, the inorganic members 2 may be disposed at predetermined locations in the cured resin layers 17 before the substantial formation of the concave portions 20, and then the cavities 19 may be formed.

Consequently, a three-dimensional component 4 in which the plurality of the cured resin layers 17 are stacked is manufactured, the three-dimensional component 4 also includes a plurality of cavities 18 disposed at predetermined locations, the inorganic members 2 are located in the respective cavities 18, and the photocurable resin material 10 is charged in each of the cavities 18.

Next, a step of thermally curing the photocurable resin material 10 in the cavities 18 is performed. In this thermal curing step, heat treatment is performed, for example, at about 60° C. for about 4 hours. Each of the inorganic members 2 is brought into contact with the photocurable resin material 10 by this thermal curing step. When the photocurable resin material 10 is not cured and is not in contact with each inorganic member 2, low-dielectric portions are formed around the respective inorganic members 2. As a result, a photonic band gap sometimes cannot be formed as desired.

Figure 5:
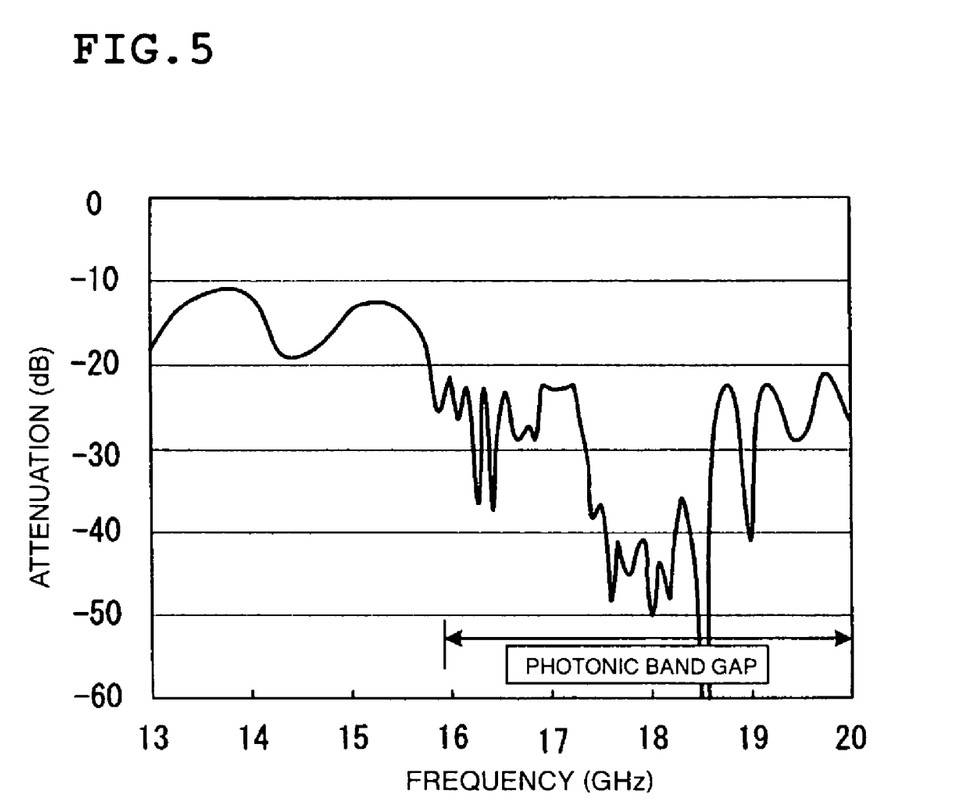
FIG. 5 is a graph showing the propagation properties of electromagnetic waves in the three-dimensional photonic structure manufactured according to a preferred embodiment of the present invention.

A three-dimensional photonic structure 1 that has a lattice constant of about 12 mm and inorganic members 2, each having a spherical shape and having a diameter of about 3 mm, composed of stabilized zirconia was manufactured as an example of the present invention by the above-described manufacturing method. This three-dimensional photonic structure 1 was placed in a waveguide, and then its electromagnetic propagation properties were measured. As a result, as shown in FIG. 5, a wide photonic band gap was observed.

Figure 6:
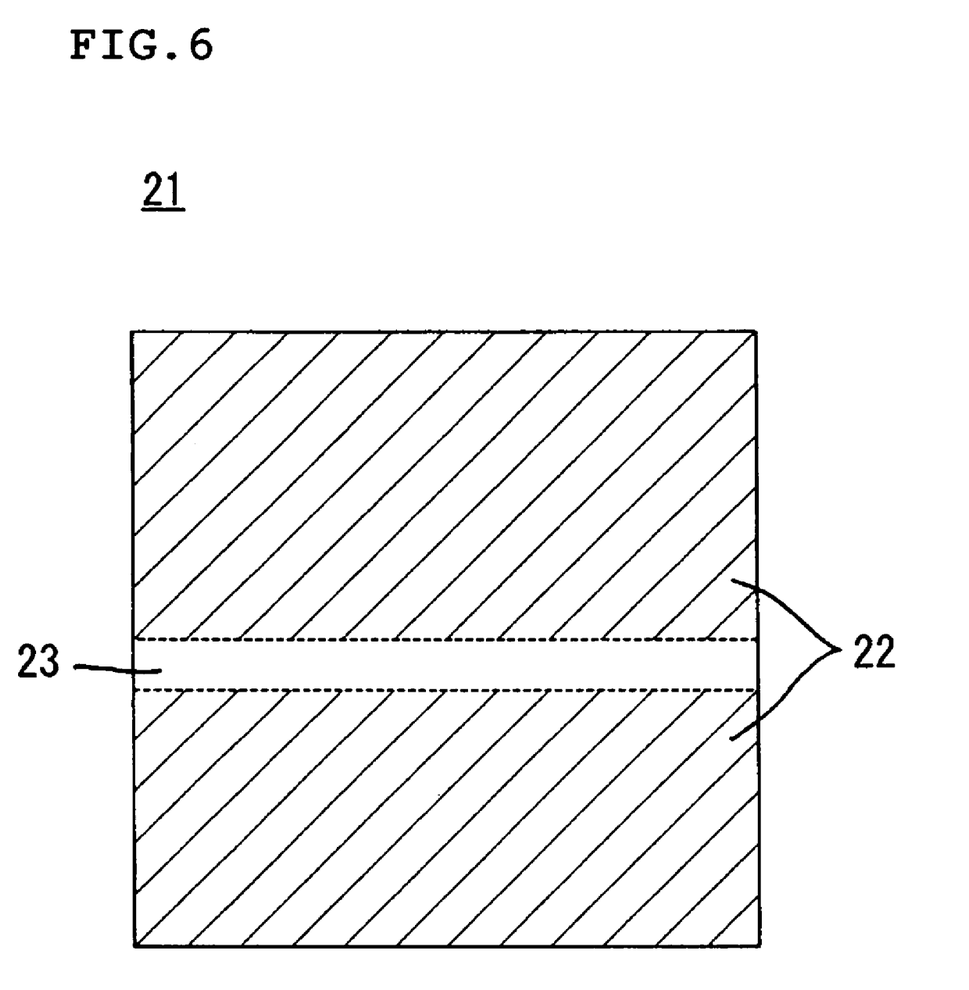
FIG. 6 is a schematic front view illustrating a three-dimensional photonic structure according to another preferred embodiment of the present invention.

FIG. 6 is a schematic front view illustrating a three-dimensional photonic structure 21 according to another preferred embodiment of the present invention.

In FIG. 6, the hatched portions represent regions 22 containing inorganic members disposed at a constant period, as shown in FIG. 1, while the other portion represents a defect region 23 containing no inorganic members and thus no lattice. The defect region 23 may be formed entirely or partially along a layer.

The method according to preferred embodiments of the present invention can be easily performed even for the three-dimensional photonic structure 21 including the defect region 23, as shown in FIG. 6.

As described above, the present invention is described with reference to the preferred embodiments. The present invention can be modified within the scope of the present invention.

For example, a three-dimensional photonic structure 1 having a plurality of pores within a resin matrix 3 may be manufactured with a photocurable resin material 10 including hollow microcapsules. In this case, a resin matrix 3 having a lower dielectric constant can be obtained.

In the above-described preferred embodiments, each of the inorganic members 2 has a dielectric constant greater than that of the resin matrix 3. On the contrary, for example, by using a resin matrix 3 containing high-dielectric ceramic particles, each of the inorganic members 2 may have a dielectric constant less than that of the resin matrix 3.

In this manner, the combination of the dielectric constants of the inorganic material portion and the resin matrix can be selected to adjust the photonic band gap as desired.

In the above-described preferred embodiments, a plurality of inorganic members 2, which have the same size and are composed of the same material as each other, are disposed in the three-dimensional photonic structure 1. Alternatively, at least two kinds of inorganic members, which have different sizes and/or are composed of different materials from each other, may be provided. That is, the photonic band gap is generated when inorganic members having the same size and the same material are merely disposed at a constant period. Therefore, even when a plurality of kinds of inorganic members are disposed in one three-dimensional photonic structure, among these inorganic members, inorganic members having the same size and being composed of the same material only need to be disposed at a constant period.

In the above-described preferred embodiments, each of the cavities has a shape corresponding to the shape of the respective inorganic members. For example, when inorganic members, each having a spherical shape, are inserted, each of the cavities may have a cylinder shape. That is, each of the cavities does not always have a shape corresponding to the shape of the respective inorganic member, provided that the desired locations are maintained.

A three-dimensional photonic structure according to various preferred embodiments of the present invention can be used to manufacture, for example, highly efficient electromagnetic-wave filters and electromagnetic-wave barriers, which are required for shielding electromagnetic waves having specific wavelengths with high contrast.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

The invention claimed is:

1. A method for manufacturing a three-dimensional photonic structure comprising a plurality of inorganic members composed of an inorganic material and a resin matrix within which the plurality of inorganic members are disposed, the resin matrix being composed of a photo-cured resin material, the method comprising the steps of:

preparing the plurality of inorganic members and a photocurable resin material;

successively and repeatedly performing a stereolithographic step for curing stacked layers composed of the photocurable resin material along a stacking direction to form a three-dimensional component such that cavities are formed at locations to be occupied by the inorganic members in the three-dimensional component having a structure in which the plurality of cured resin layers composed of the photo-cured resin material are stacked;

filling the cavities with the photocurable resin material;

inserting the inorganic members into concave portions of the cavities before closing the cavities during the stereolithographic step, each of the concave portions being at least a portion of the corresponding cavity and having an opening through which each of the inorganic members can pass, each gap between the surface of each of the concave portions and the corresponding inorganic member being filled with the photocurable resin material; and thermally curing the photocurable resin material remaining in the cavities.

2. The method for manufacturing a three-dimensional photonic structure according to claim 1, further comprising the steps of:

generating three-dimensional data of the shape of the three-dimensional component in advance;

generating slice data from the three-dimensional data, the slice data being generated by slicing the three-dimensional component in a direction that is substantially perpendicular to the stacking direction of the three-dimensional component; and generating raster data for scanning laser light from the slice data, wherein, in the stereolithographic step, the photocurable resin material is repeatedly cured in the form of layers by scanning the laser light according to the raster data.

3. The method for manufacturing a three-dimensional photonic structure according to claim 1, wherein each of the inorganic members has a dielectric constant that is greater than that of the photo-cured resin material.

4. The method for manufacturing a three-dimensional photonic structure according to claim 3, wherein each of the inorganic members is a ceramic sinter.

5. The method for manufacturing a three-dimensional photonic structure according to claim 1, wherein the photocurable resin material forms a plurality of pores within the photocurable resin.

6. The method for manufacturing a three-dimensional photonic structure according to claim 1, wherein the inorganic members include a high-dielectric ceramic selected from the group consisting of $BaTiO_3$, $PbTiO_3$, $NaVO_3$, $(Ba,SR)TiO_3$, $KNbO_3$, $LiTaO_3$, $(Ba,Pb)ZrO_3$, $Pb(Mg,W)ZrO_3$, $Pb(Mg,Nb)ZrO_3$, $CaTiO_3$, and $TiO_2$.

7. The method for manufacturing a three-dimensional photonic structure according to claim 1, wherein the shape of the inorganic members is spherical.

8. The method for manufacturing a three-dimensional photonic structure according to claim 2, wherein the scanning laser light is ultraviolet laser light.

9. The method for manufacturing a three-dimensional photonic structure according to claim 2, wherein the stereolithographic step includes the steps of:

providing a bath containing the photocurable resin material and a platform for manufacturing the three-dimensional component that is disposed in the bath;

driving the platform so as to be gradually lowered to a predetermined height such that a portion of the photocurable resin material is disposed on the platform;

reflecting laser light emitted from a laser light source with a scanning mirror toward the photocurable resin material disposed on the platform so as to cure the photocurable resin material disposed on the platform; and repeating the steps of driving the platform and reflecting the laser light so as to form the stacked layers.

10. The method for manufacturing a three-dimensional photonic structure according to claim 1, wherein each of the concave portions is sized so as to accommodate an entire one of said inorganic members.

* * * * *